(12) United States Patent
Mizuno

(10) Patent No.: US 11,778,326 B2
(45) Date of Patent: Oct. 3, 2023

(54) CONTROL APPARATUS TO CONTROL PERFORMING PAN OR TILT DRIVE, CONTROL METHOD, AND RECORDING MEDIUM

(71) Applicant: CANON KABUSHIKI KAISHA, Tokyo (JP)

(72) Inventor: Takayoshi Mizuno, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/583,962

(22) Filed: Jan. 25, 2022

(65) Prior Publication Data
US 2022/0239839 A1 Jul. 28, 2022

(30) Foreign Application Priority Data
Jan. 28, 2021 (JP) ................. 2021-012468

(51) Int. Cl.
*H04N 23/695* (2023.01)
*H04N 23/65* (2023.01)

(52) U.S. Cl.
CPC ........... *H04N 23/695* (2023.01); *H04N 23/65* (2023.01)

(58) Field of Classification Search
CPC ................. H04N 5/23299; H04N 5/23241
USPC .................................. 348/207.11
See application file for complete search history.

(56) References Cited

U.S. PATENT DOCUMENTS

| | | | | |
|---|---|---|---|---|
| 6,526,232 B1 * | 2/2003 | Mizumura | ........... | H04N 23/661 396/76 |
| 7,298,398 B2 * | 11/2007 | Teramoto | ............... | H04N 7/183 348/208.99 |
| 7,546,033 B2 * | 6/2009 | Kawada | ................. | H04N 23/65 396/301 |
| 8,531,525 B2 * | 9/2013 | McCormack | ...... | G08B 13/1963 348/143 |
| 8,866,935 B2 * | 10/2014 | Kagei | ..................... | H04N 23/69 348/240.3 |
| 9,420,187 B2 * | 8/2016 | Neufeld | ................. | H04N 23/66 |
| 9,742,974 B2 * | 8/2017 | Tang | ..................... | H04N 23/695 |
| 11,172,136 B2 * | 11/2021 | Koga | ..................... | H04N 23/66 |
| 2004/0212679 A1 * | 10/2004 | Jun | .................. | G08B 13/19641 348/E7.086 |
| 2004/0263681 A1 * | 12/2004 | Teramoto | ........... | G08B 13/1963 348/E7.087 |
| 2011/0149072 A1 * | 6/2011 | McCormack | .......... | H04N 7/181 348/143 |

(Continued)

FOREIGN PATENT DOCUMENTS

JP 2004096588 A 3/2004

*Primary Examiner* — Pritham D Prabhakher
(74) *Attorney, Agent, or Firm* — CANON U.S.A., INC. IP Division

(57) ABSTRACT

An imaging apparatus configured to (a) acquire information about a target position of pan or tilt drive of the imaging apparatus and information about a first driving speed associated with the target position; and (b) control an imaging direction of the imaging apparatus by performing the pan or tilt drive to the target position according to the first driving speed. In a case where the imaging apparatus is in a specific state at a time of controlling the imaging direction by performing the pan or tilt drive to the target position, the imaging direction is controlled by performing the pan or tilt drive according to a second driving speed higher than the first driving speed.

9 Claims, 9 Drawing Sheets

(56) References Cited

U.S. PATENT DOCUMENTS

| | | | |
|---|---|---|---|
| 2013/0222651 A1* | 8/2013 | Kagei | H04N 5/262 |
| | | | 348/335 |
| 2015/0156422 A1* | 6/2015 | Neufeld | H04N 23/635 |
| | | | 348/240.3 |
| 2016/0173755 A1* | 6/2016 | Hashiguchi | H04N 5/222 |
| | | | 348/211.3 |
| 2016/0330382 A1* | 11/2016 | Neufeld | H04N 23/66 |
| 2017/0064217 A1* | 3/2017 | Ota | H04N 23/62 |
| 2017/0163881 A1* | 6/2017 | Oshima | H04N 23/69 |
| 2017/0163899 A1* | 6/2017 | Irie | H04N 23/632 |
| 2017/0195577 A1* | 7/2017 | Mitani | H04N 23/631 |
| 2018/0176470 A1* | 6/2018 | Kim | G03B 5/02 |
| 2018/0234635 A1* | 8/2018 | Hayashi | H04N 23/695 |
| 2021/0058557 A1* | 2/2021 | Koga | H04N 23/62 |

* cited by examiner

CONTROL APPARATUS TO CONTROL PERFORMING PAN OR TILT DRIVE, CONTROL METHOD, AND RECORDING MEDIUM

BACKGROUND

Technical Field

One disclosed aspect of the embodiments relates to a control apparatus, a control method, and a recording medium.

Description of the Related Art

A technique for storing a driving speed together with pan/tilt positions in a preset function is conventionally known (refer to Japanese Patent Application Laid-Open No. 2004-96588).

SUMMARY

In order to control a driving speed to a preset position according to a camera state, an imaging apparatus according to an aspect of the embodiments configured to (a) acquire information about a target position of pan or tilt drive of the imaging apparatus and information about a first driving speed associated with the target position; and (b) control an imaging direction of the imaging apparatus by performing the pan or tilt drive to the target position according to the first driving speed. In a case where the imaging apparatus is in a specific state at a time of controlling the imaging direction by performing the pan or tilt drive to the target position, the imaging direction is controlled by performing the pan or tilt drive according to a second driving speed higher than the first driving speed.

Further features of the disclosure will become apparent from the following description of exemplary embodiments with reference to the attached drawings.

DESCRIPTION OF THE EMBODIMENTS

Various exemplary embodiments will be described in detail below with reference to the attached drawings.

Figure 1:
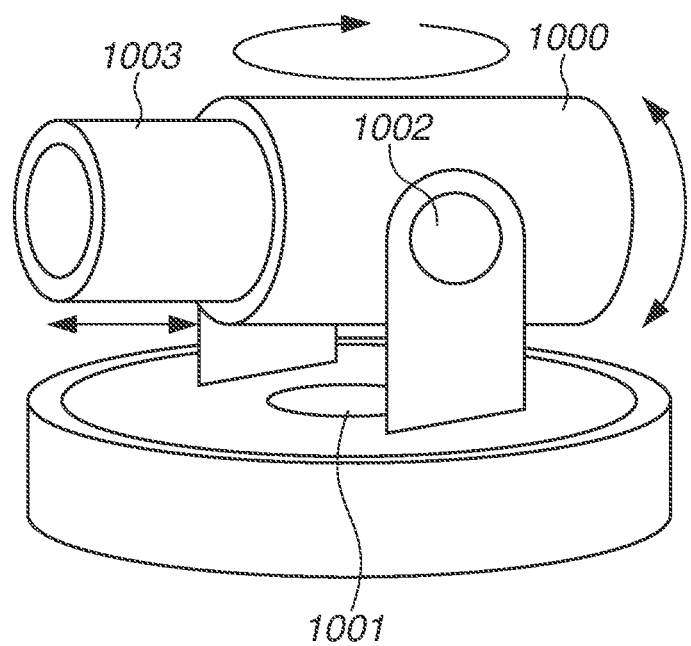
FIG. 1 is a configuration diagram illustrating an example of an external appearance of an imaging apparatus.

A first exemplary embodiment will be described. FIG. 1 illustrates a network camera (an imaging apparatus) as an exemplary embodiment. In the following, the term "unit" refers to a circuit, a device, a subsystem, or a processor. It may also refer to a functionalities that is performed by a processor when executed a program stored in a memory.

A pan drive mechanism 1001 can change an imaging area of a network camera 1000 (also referred to as a camera 1000) in a pan direction and turn from −170 degrees to 170 degrees.

A tilt drive mechanism 1002 can change the imaging area of the network camera 1000 in a tilt direction and turn from −30 degrees with respect to a horizontal direction to +90 degrees in an upward direction.

A zoom mechanism 1004 changes an angle of view of the network camera 1000.

Figure 2:
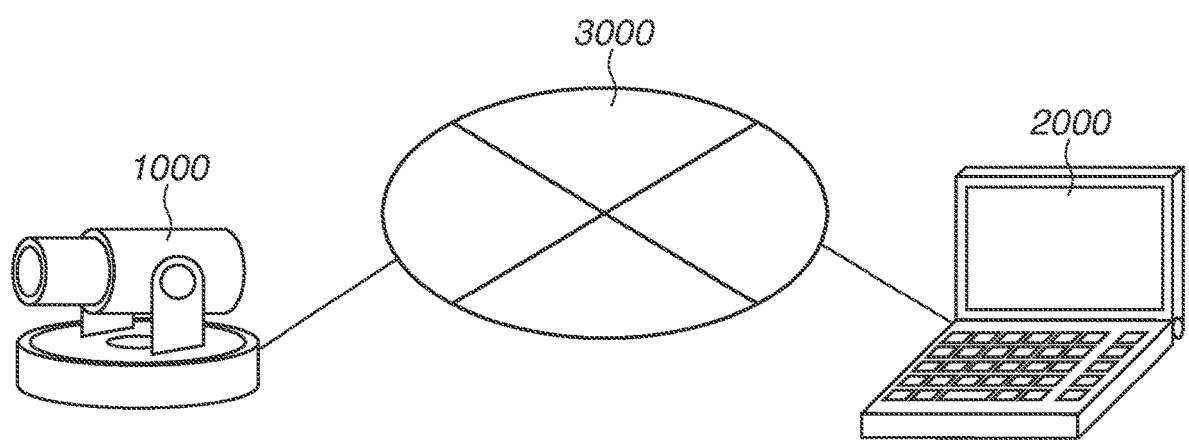
FIG. 2 is a configuration diagram illustrating an example of an imaging system.

FIG. 2 is a system configuration diagram including the network camera 1000. A client apparatus 2000 represents an external apparatus. The network camera 1000 and the client apparatus 2000 are connected to each other in a communicable state via a network 3000. The client apparatus 2000 performs control related to an angle of view, an image quality, switching of a standby state, or the like with respect to the network camera 1000. The standby state described here represents a state in which a power supply amount to the camera 1000 is temporarily reduced to limit video distribution and camera control. The network camera 1000 transmits a response to each command related to the above-described control to the client apparatus 2000.

Figure 3:
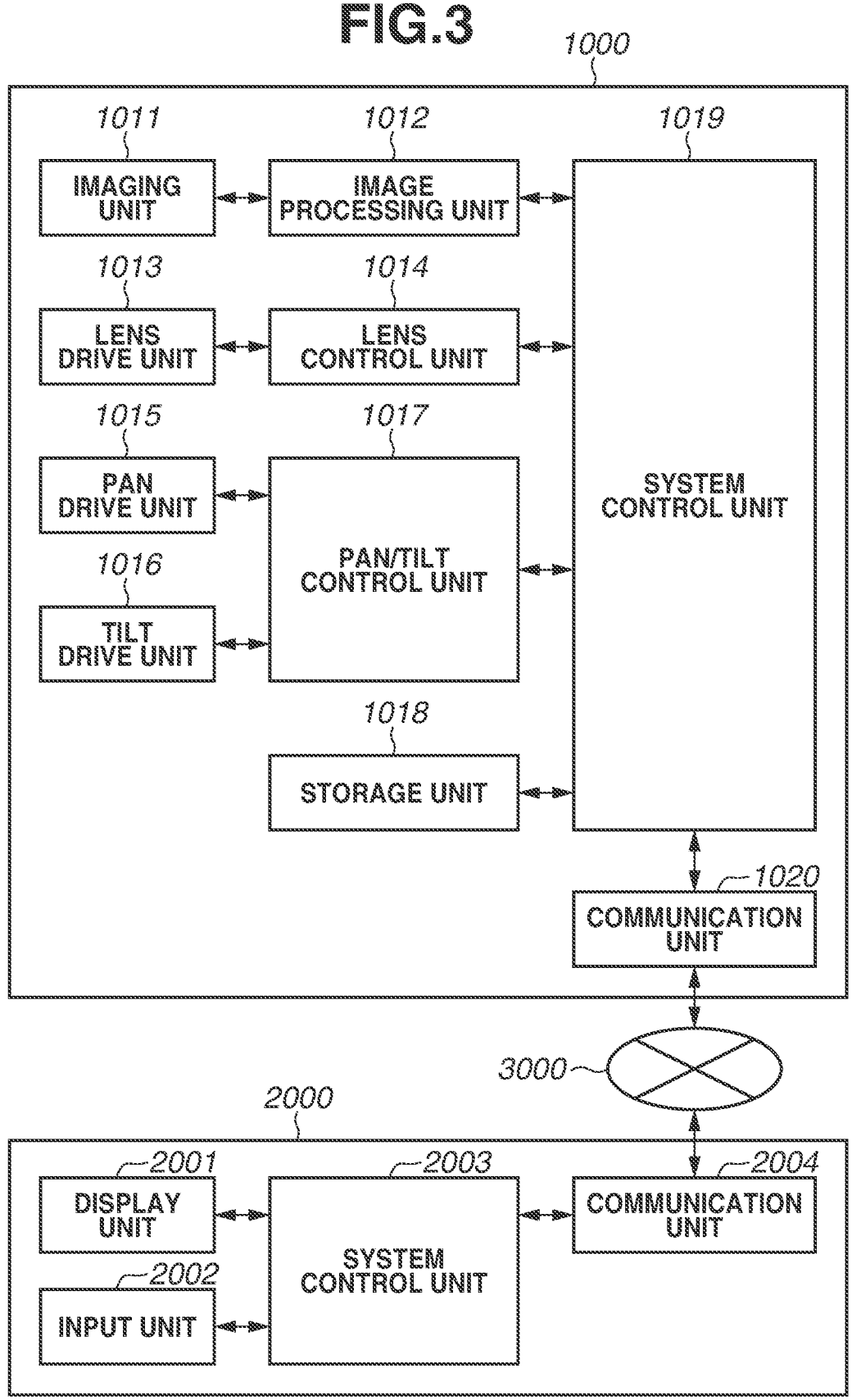
FIG. 3 is a configuration diagram illustrating an example of a configuration of an imaging apparatus.

A configuration and a function of each unit in the camera 1000 will be described with reference to FIG. 3.

An imaging unit 1011 captures an image of an object and converts the image into an electrical signal.

An image processing unit 1012 performs predetermined image processing and compression coding processing on the signal captured and photoelectrically converted by the imaging unit 1011 to generate image data. The image data to be generated is not limited to one, and a plurality of image data having different resolutions and different video qualities can be generated at the same time. The image processing unit 1012 transmits the generated image data to a system control unit 1019.

A lens drive unit 1013 includes drive systems of a focus lens and a zoom lens, and operation thereof is controlled by a lens control unit 1014.

The lens control unit 1014 controls the lens drive unit 1013 based on an instruction transmitted from the system control unit 1019. Further, the lens control unit 1014 transmits focus movement information and zoom movement information to the system control unit 1019.

A pan drive unit 1015 includes a mechanical drive system which performs a pan operation for changing an imaging direction of the imaging unit 1011 and a motor as a drive source. An operation of the pan drive unit 1015 is controlled by a pan/tilt control unit 1017.

A tilt drive unit 1016 includes a mechanical drive system which performs a tilt operation for changing the imaging direction of the imaging unit 1011 and a motor as the drive source. An operation of the tilt drive unit 1016 is controlled by the pan/tilt control unit 1017.

The pan/tilt control unit 1017 controls the pan drive unit 1015 and the tilt drive unit 1016 based on an instruction transmitted from the system control unit 1019.

A storage unit 1018 stores preset information, the image data, various setting commands, and the like. The preset information is information in which a target position of pan or tilt drive and a driving speed are associated with each other. Further, the storage unit 1018 stores operation information recorded using a trace function and a reproduction start position of a trace record.

The system control unit 1019 analyzes a transmitted camera control command and performs processing in accordance with the command. For example, the system control unit 1019 instructs the image processing unit 1012 to adjust the image quality, instructs the lens control unit 1014 to perform zoom control and focus control, and instructs the pan/tilt control unit 1017 to perform a pan or tilt operation. The system control unit 1019 acquires the image data generated by the image processing unit 1012 and transmits the image data to a communication unit 1020. Further, the system control unit 1019 performs start-up processing of the imaging apparatus according to the present exemplary embodiment, pan/tilt initialization processing, shift and restoration processing to and from the standby state, and control related to the trace function.

The trace function described here is a function of storing pan, tilt, zoom, and focus control and image quality control performed by a user within a certain period of time in the storage unit 1018. The pan, tilt, zoom, and focus control and the image quality control performed by the user can be reproduced by reproducing the trace record stored in the storage unit 1018 at an arbitrary timing. In the trace function, the reproduction start position from which the trace record is reproduced is stored in the storage unit 1018 in addition to information about the control performed by the user within the certain period of time. In a case where a movement to the reproduction start position is instructed during reproduction of the trace record, the trace record is moved to the reproduction start position stored in the storage unit 1018 to be reproduced.

The communication unit 1020 transmits the image data transmitted from the system control unit 1019 to the client apparatus 2000. The communication unit 1020 receives various setting commands and camera control commands transmitted from the client apparatus 2000 and transmits the commands to the system control unit 1019. The communication unit 1020 further transmits, to the client apparatus 2000, a response from the camera 1000 with respect to the command transmitted from the client apparatus 2000.

The configuration of the camera 1000 is not limited to the above-described one.

Next, a configuration and a function of each unit in the client apparatus 2000 will be described. As the client apparatus 2000, a general-purpose computer such as a personal computer and a mobile terminal such as a tablet are used.

A display device such as a liquid crystal projector and a liquid crystal monitor is used as a display unit 2001, and the display unit 2001 displays an image acquired from the camera 1000 and a graphic user interface (hereinbelow, referred to as a GUI) for controlling the camera.

As an input unit 2002, a keyboard, a pointing device such as a mouse and a touch panel, and the like are used, and a user of the client apparatus 2000 operates the GUI via the input unit 2002.

A communication unit 2004 transmits various setting commands and camera control commands transmitted from a system control unit 2003 to the camera 1000. The communication unit 2004 further transmits, to the system control unit 2003, the image data transmitted from the camera 1000 and the response from the camera 1000 with respect to the command transmitted from the client apparatus 2000.

The system control unit 2003 generates the various setting commands and camera control commands in response to a GUI operation by a user and transmits the commands to the camera 1000 via the communication unit 2004. The system control unit 2003 receives responses from the camera 1000 with respect to the transmitted various setting commands and camera control commands via the communication unit 2004. The system control unit 2003 further displays the image data received from the camera 1000 via the communication unit 2004 on the display unit 2001.

As described above, the client apparatus 2000 can perform various types of camera control on the camera 1000 via the network 3000.

The present exemplary embodiment is characterized in that the camera 1000 determines a driving speed for preset control in processing performed at a time of power-on.

Figure 4:
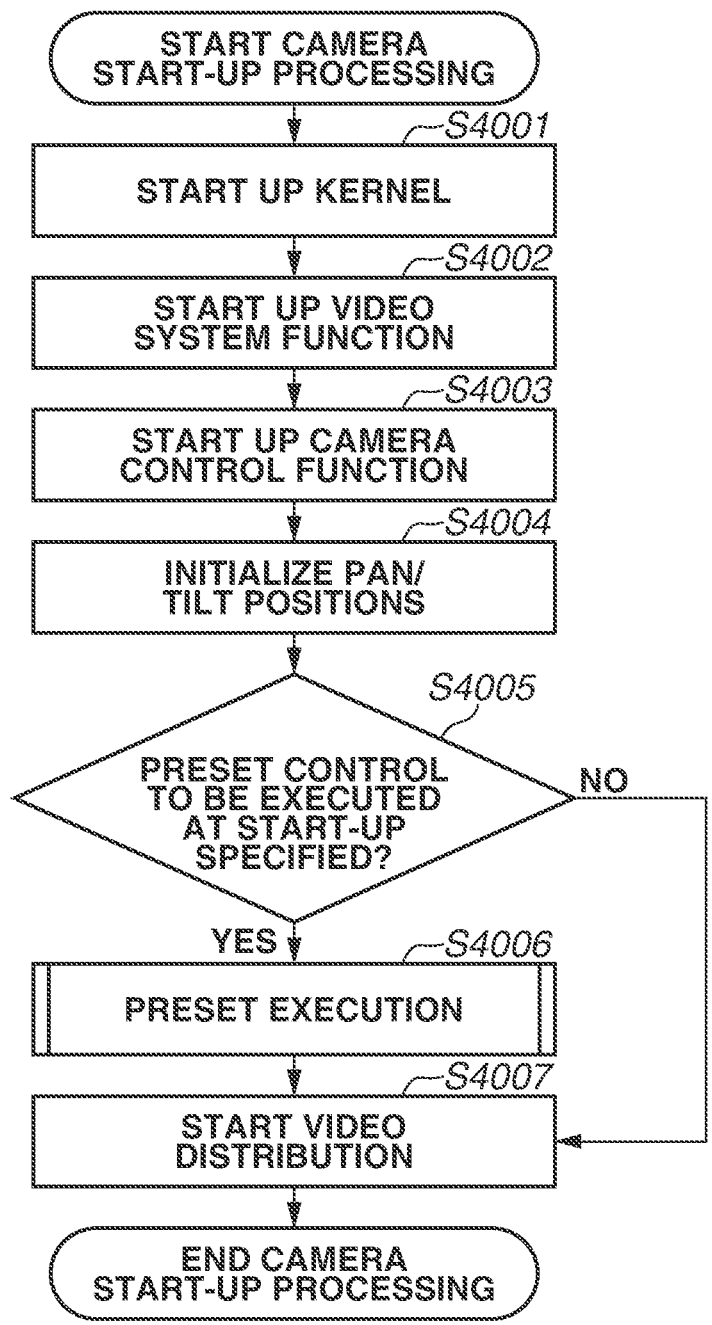
FIG. 4 is a flowchart illustrating an example of processing at a time of power-on of an imaging apparatus according to a first exemplary embodiment.

FIG. 4 is a flowchart illustrating an example of start-up processing at the time of power-on of the camera 1000 according to the present exemplary embodiment.

In step S4001, the system control unit 1019 starts up a kernel of the camera 1000 and advances the processing to step S4002.

In step S4002, the system control unit 1019 starts up a video system function of the camera 1000 and advances the processing to step S4003.

In step S4003, the system control unit 1019 starts up a camera control function of the camera 1000 and advances the processing to step S4004.

In step S4004, the system control unit 1019 initializes pan/tilt positions of the camera 1000 and advances the processing to step S4005.

In step S4005, the system control unit 1019 (a reception unit) determines whether the preset control to be executed at the time of start-up is specified (a drive instruction of preset drive is received). In a case where it is determined that the preset control to be executed is specified (the drive instruction is received) (YES in step S4005), the system control unit 1019 advances the processing to step S4006. In a case where it is determined that the preset control to be executed is not specified (NO in step S4005), the system control unit 1019 advances the processing to step S4007.

In step S4006, the system control unit 1019 executes the preset control and advances the processing to step S4007. The preset control is described in detail with reference to FIG. 5.

In step S4007, the system control unit 1019 starts video distribution and terminates the start-up processing of the camera 1000.

Figure 5:
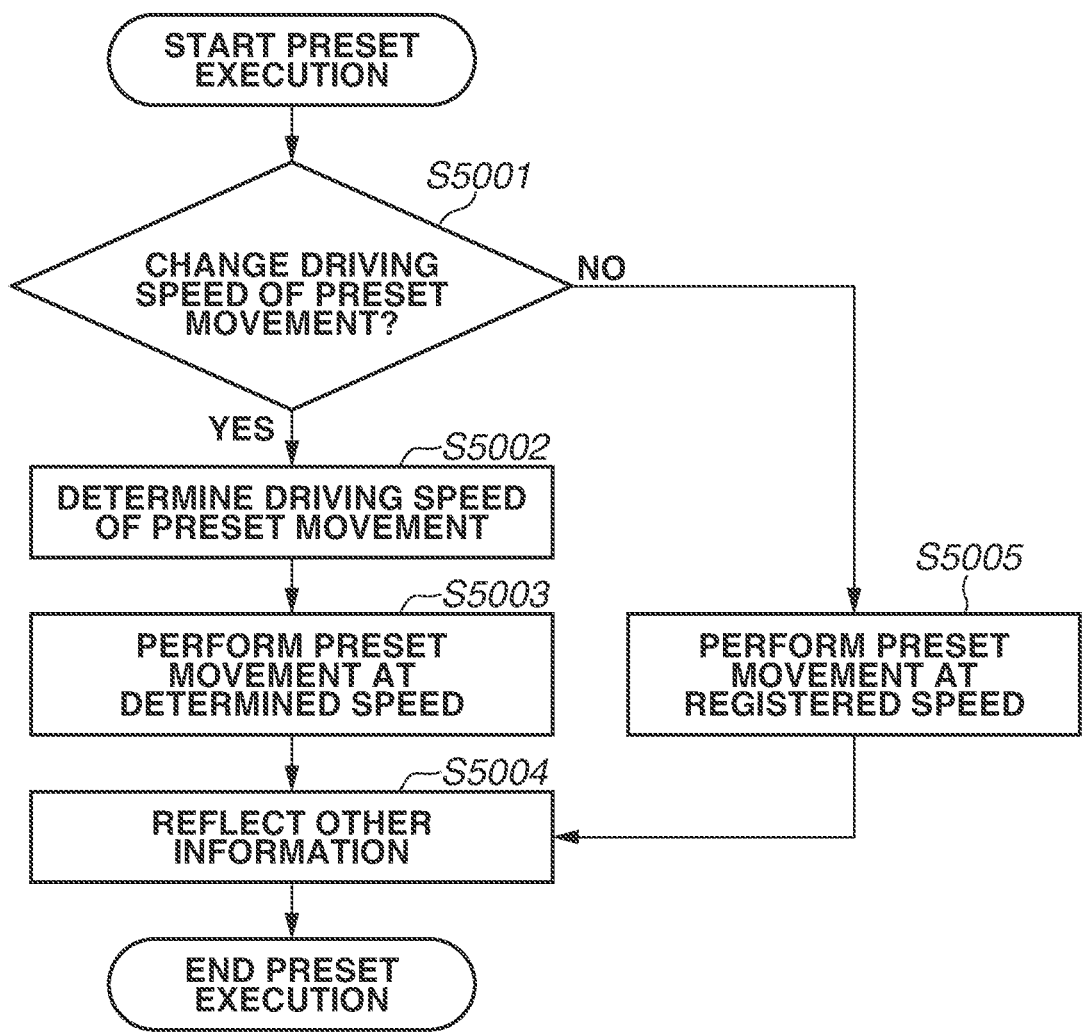
FIG. 5 is a flowchart illustrating an example of preset execution processing according to the first exemplary embodiment.

FIG. 5 is a flowchart illustrating a "preset execution" processing flow in step S4006 in FIG. 4.

In step S5001, the system control unit 1019 determines whether to change a driving speed for a preset movement. At that time, the system control unit 1019 acquires a camera state and may determine to change the driving speed for the preset movement in a case where the camera state is a state including an initialization operation such as during start-up, at the time of restoration from the standby state, and at the time of pan/tilt initialization. In a case where it is determined to change the driving speed for the preset movement (YES in step S5001), the system control unit 1019 advances the processing to step S5002. In a case where it is determined not to change the driving speed for the preset movement (NO in step S5001), the system control unit 1019 advances the processing to step S5005.

In step S5002, the system control unit 1019 (a determination unit) determines the driving speed for the preset movement and advances the processing to step S5004. The driving speed for the preset movement is determined, for example, to a speed (a second driving speed, for example, a maximum speed at which the pan drive unit 1015 or the tilt drive unit 1016 can drive) which is higher than a movement speed (a first driving speed) registered in the preset. The speed may be dynamically determined according to the camera state at the time of the preset execution.

In step S5003, the system control unit 1019 performs the preset movement at the speed determined in step S5002 and advances the processing to step S5004.

In step S5004, the system control unit 1019 reflects other information registered in the preset such as an iris, a gain, and a white balance in the camera 1000 and terminates the processing.

In step S5005, the system control unit 1019 performs the preset movement at the speed registered in the preset and advances the processing to step S5004.

The system control unit 1019 determines whether to change the driving speed for the preset movement according to the camera state in step S5001, but a determination method is not limited to this.

For example, in a case where the preset movement is instructed, depending on whether a specific driving speed is specified, the system control unit 1019 may determine whether to perform the preset movement at the specified speed or at the speed registered in the preset in advance. In a case where the specific driving speed is specified together with the instruction for the preset movement, the preset movement is performed at the specific driving speed in preference to the driving speed registered in advance for each preset position. This is, for example, a situation in which a user specifies the driving speed each time the user instructs driving to the preset position, but the present exemplary embodiment is not limited to this.

In a case where the preset control is executed as a function within the camera 1000, the system control unit 1019 may determine to change the driving speed and determine a driving speed set for each function. Further, in a case where the preset control is executed from the outside of the camera (for example, by a preset control instruction from a user via a web application), the system control unit 1019 may determine the driving speed registered in the preset.

The system control unit 1019 may determine whether to perform the preset movement at the maximum speed or the driving speed registered in the preset according to a time required for completing the preset movement. For example, in a case where a time required for a movement from a current position to the target position is a threshold value or more, the preset movement is driven at the maximum speed, whereas in a case where the required time is less than the threshold value, the preset movement is driven at the driving speed registered in the preset.

As described above, according to the present exemplary embodiment, the camera 1000 determines the driving speed for a preset function according to the camera state. Accordingly, if the same preset is specified for the preset control by the start-up processing at the time of power-on and for the preset control by a user, the preset control can be used appropriately at the speed according to the camera state.

According to a second exemplary embodiment, a camera 1000 changes a speed for preset control in processing performed at pan/tilt initialization.

Descriptions of the same configurations and contents as those described in the first exemplary embodiment will be omitted.

Figure 6:
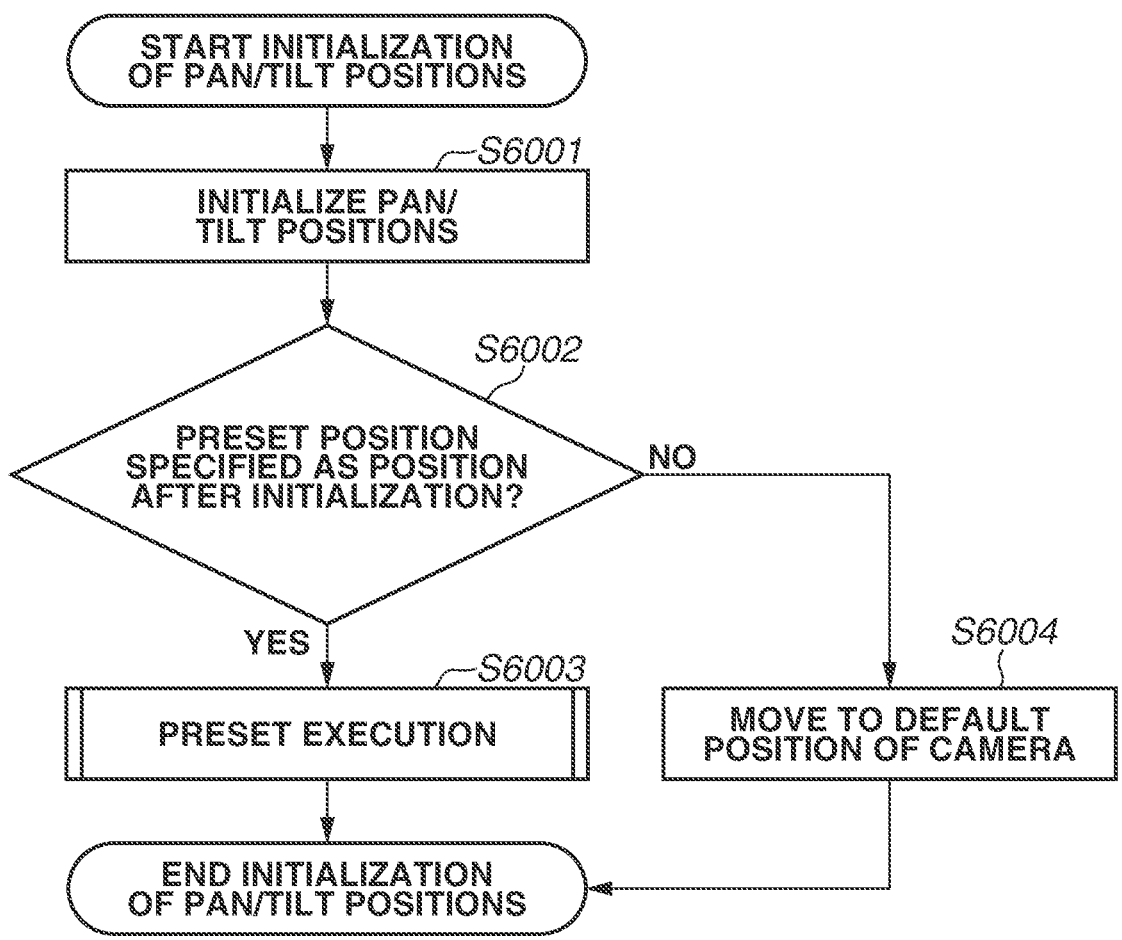
FIG. 6 is a flowchart illustrating an example of processing at a time of initialization of pan/tilt positions according to a second exemplary embodiment.

A processing flow of the camera 1000 for performing initialization of pan/tilt positions will be described with reference to FIG. 6.

In step S6001, the system control unit 1019 instructs the pan/tilt control unit 1017 to initialize the pan/tilt positions and advances the processing to step S6002.

In step S6002, the system control unit 1019 confirms whether the preset position is specified as the position after the pan/tilt initialization. In a case where the preset position is specified as a result of the confirmation (YES in step S6002), the system control unit 1019 advances the processing to step S6003. In a case where the preset position is not specified (NO in step S6002), the system control unit 1019 advances the processing to step S6004.

In step S6003, the system control unit 1019 executes the preset control and terminates the pan/tilt initialization processing of the camera 1000. The detail of the preset control is referred to FIG. 5.

In step S6004, the system control unit 1019 moves to a default position of the camera 1000 and terminates the pan/tilt initialization processing.

The description of FIG. 5 will be omitted since it is described in the first exemplary embodiment.

As described above, according to the present exemplary embodiment, the camera 1000 determines the driving speed for the preset function according to the camera state. Accordingly, if the same preset is specified for the preset control after the pan/tilt initialization and for the preset control by a user, the preset control can be used appropriately at the speed according to the camera state.

According to a third exemplary embodiment, a camera 1000 changes a speed for preset control in processing of restoration from a standby state.

Descriptions of the same configurations and contents as those described in the first exemplary embodiment will be omitted.

Figure 7:
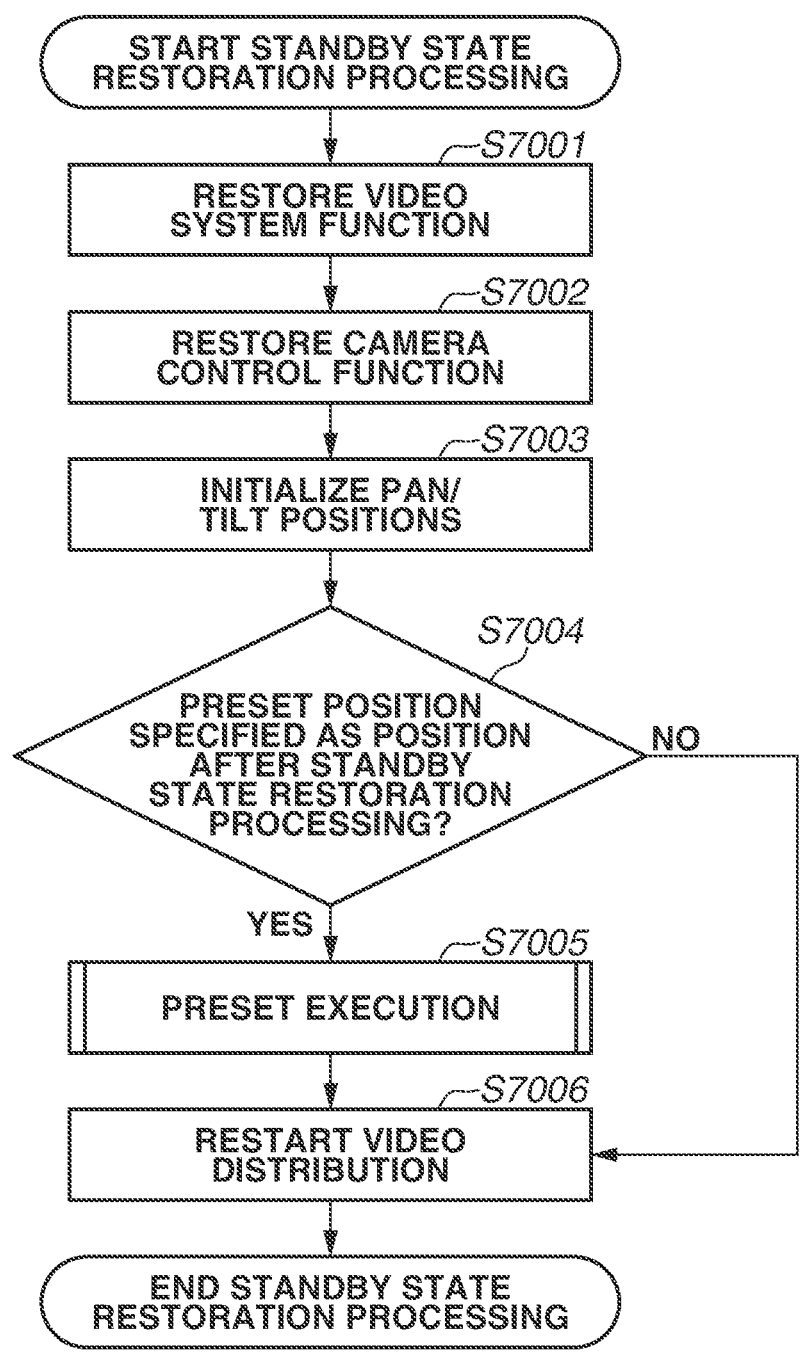
FIG. 7 is a flowchart illustrating an example of processing at a time of restoration from a standby state according to a third exemplary embodiment.

FIG. 7 is a flowchart illustrating an example of processing for restoring from the standby state of an imaging apparatus according to the present exemplary embodiment In step S7001, the system control unit 1019 restores a function related to imaging (i.e., a video system function) and advances the processing to step S7002.

In step S7002, the system control unit 1019 restores a camera control function and advances the processing to step S7003.

In step S7003, the system control unit 1019 initializes pan/tilt positions and advances the processing to step S7004.

In step S7004, the system control unit 1019 determines whether a preset position is specified as a position after restoration processing from the standby state. In a case where the preset position is specified (YES in step S7004), the system control unit 1019 advances the processing to step S7005. In a case where the preset position is not specified (NO in step S7004), the system control unit 1019 advances the processing to step S7006.

In step S7005, the system control unit 1019 executes the preset control and advances the processing to step S7006. The detail of the preset control is illustrated in FIG. 5.

In step S7006, the system control unit 1019 restarts distribution of a video captured by the camera 1000 and terminates the restoration processing from the standby state.

The description of FIG. 5 will be omitted since it is described in the first exemplary embodiment.

As described above, according to the present exemplary embodiment, the camera 1000 determines the driving speed for the preset function according to the camera state. Accordingly, if the same preset is specified for the preset control after restoration from the standby state and for the preset control by a user, the preset control can be used appropriately at the speed according to the camera state.

A fourth exemplary embodiment is characterized in that a camera 1000 changes a speed for preset control in processing performed at trace record reproduction.

The present exemplary embodiment is another exemplary embodiment of the camera 1000 according to the first exemplary embodiment. Descriptions of the same configurations and contents as those described in the first exemplary embodiment will be omitted in the present exemplary embodiment.

A processing flow of the camera 1000 for changing the speed for the preset control in the processing performed at trace record reproduction will be described with reference to FIGS. 8, 9, and 5.

Figure 8:
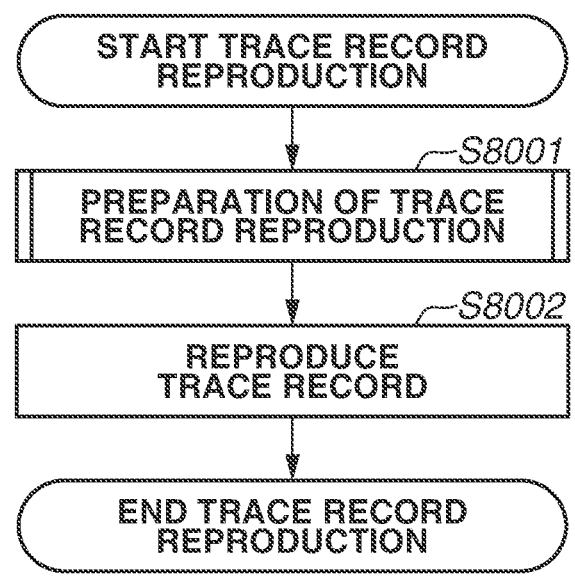
FIG. 8 is a flowchart illustrating an example of processing at a time of trace record reproduction according to a fourth exemplary embodiment.

FIG. 8 is a flowchart illustrating an example of processing for preparing trace record reproduction by an imaging apparatus according to the present exemplary embodiment.

In step S8001, the system control unit 1019 performs reproduction preparation processing such as a movement to a reproduction start position and image quality control at a start time in order to reproduce a trace record. The reproduction preparation processing is described in detail with reference to FIG. 9. If the reproduction preparation of the trace record is completed, the system control unit 1019 advances the processing to step S8002.

In step S8002, the system control unit 1019 reproduces the trace record and terminates the processing.

Figure 9:
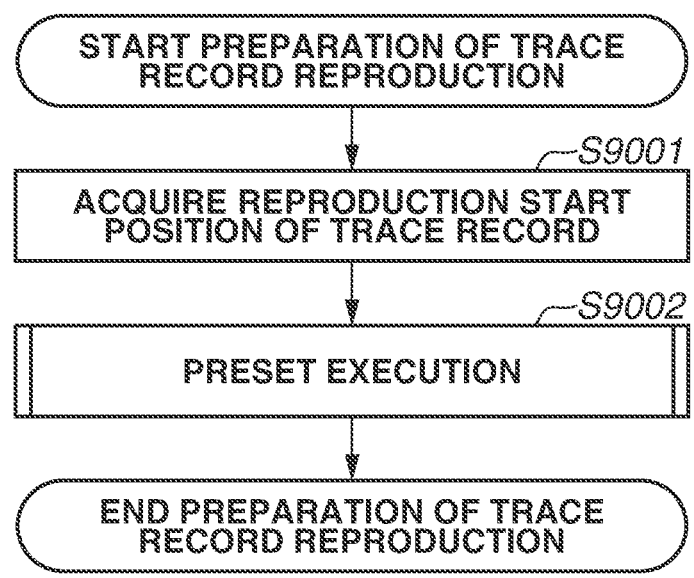
FIG. 9 is a flowchart illustrating an example of processing at a time of preparation of trace record reproduction according to the fourth exemplary embodiment.

FIG. 9 is a flowchart illustrating an example of processing for preparing the trace record reproduction by the imaging apparatus according to the present exemplary embodiment.

In step S9001, the system control unit 1019 acquires the reproduction start position of the trace record from the storage unit 1018 and advances the processing to step S9002.

In step S9002, the system control unit 1019 executes the preset control specified at the reproduction start position and terminates the processing. The detail of the preset control is illustrated in FIG. 5.

According to the present exemplary embodiment, the camera 1000 determines the driving speed for the preset function according to the camera state as described above. Accordingly, if the same preset is specified for the preset control specified at the reproduction start position of the trace record and for the preset control by a user, the preset control can be used appropriately at the speed according to the camera state.

While the disclosure has been described with reference to the exemplary embodiments, it is to be understood that the disclosure is not limited to the disclosed exemplary embodiments and can be modified and changed in various ways without departing from the gist of the disclosure. Further, each of the exemplary embodiments may be appropriately combined.

The functions of the above-described exemplary embodiments can also be realized by following configurations. More specifically, a program code for executing the processing of the above-described exemplary embodiments is supplied to a system or an apparatus, and a computer (or a central processing unit (CPU) or a micro processing unit (MPU)) of the system or the apparatus executes the program code and realizes the functions. In this case, the program code itself read out from a recording medium realizes the functions of the above-described exemplary embodiments, and further, the recording medium storing the program code also realizes the functions of the above-described exemplary embodiments.

According to the disclosure, a driving speed to a preset position of pan or tilt drive can be controlled in response to a drive instruction.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-012468, filed Jan. 28, 2021, which is hereby incorporated by reference herein in its entirety.

What is claimed is:

1. An imaging apparatus comprising a computer executing instructions that, when executed by the computer, cause the computer to:
   acquire preset information in which a target position of pan or tilt drive of the imaging apparatus and a first driving speed are associated with each other; and
   control the imaging apparatus to the target position based on the preset information, and
   wherein in a case where the imaging apparatus is in a specific state, control the imaging apparatus to the target position by performing the pan or tilt drive according to a second driving speed higher than the first driving speed,
   wherein the specific state is a state in which (a) the imaging apparatus has been started up by power-on of the imaging apparatus or (b) the imaging apparatus has been restored from a standby state in which control of the imaging apparatus is limited.

2. The imaging apparatus according to claim 1, wherein the second driving speed is a maximum speed at which the imaging apparatus can perform the pan or tilt drive.

3. The imaging apparatus according to claim 1, wherein, in a case where the imaging apparatus is not in the specific state, the imaging apparatus is controlled to the target position based on the preset information.

4. The imaging apparatus according to claim 1, the second driving speed is determined by a system control unit.

5. A method for controlling an imaging apparatus, the method comprising:
   acquiring preset information about a target position of pan or tilt drive of the imaging apparatus and information about a first driving speed associated with the target position; and
   controlling the imaging apparatus to the target position according to the preset information,
   wherein, in a case where the imaging apparatus is in a specific state, the imaging apparatus is controlled to the target position according to a second driving speed higher than the first driving speed,
   wherein the specific state is a state in which (a) the imaging apparatus has been started up by power-on of the imaging apparatus or (b) the imaging apparatus has been restored from a standby state in which control of the imaging apparatus is limited.

6. The method according to claim 5, wherein the second driving speed is a maximum speed at which the imaging apparatus can perform the pan or tilt drive.

7. The method according to claim 5, wherein, in a case where the imaging apparatus is not in the specific state, the imaging apparatus is controlled to the target position based on the preset information.

8. The imaging apparatus according to claim 5, the second driving speed is determined by a system control unit.

9. A computer-readable non-transitory recording medium storing a program for causing a computer to execute a method for controlling an imaging apparatus, the method comprising:
   acquiring preset information about a target position of pan or tilt drive of the imaging apparatus and a first driving speed associated with each other; and
   controlling the imaging apparatus to the target position the preset information,
   wherein, in a case where the imaging apparatus is in a specific state, the imaging apparatus is controlled to the target position according to a second driving speed higher than the first driving speed,
   wherein the specific state is a state in which (a) the imaging apparatus has been started up by power-on of the imaging apparatus or (b) the imaging apparatus has been restored from a standby state in which control of the imaging apparatus is limited.

\* \* \* \* \*